United States Patent
Muller

[11] 3,804,395
[45] Apr. 16, 1974

[54] PRESSURIZED RUBBER FOR ABSORBING IMPACT ENERGY

[76] Inventor: John G. Muller, P.O. 7817 Calpurnia Ct., McLean, Va. 22101

[22] Filed: Dec. 29, 1971

[21] Appl. No.: 213,625

Related U.S. Application Data

[63] Continuation-in-part of Ser. No. 111,534, Feb. 1, 1971.

[52] U.S. Cl. .............................................. 267/140
[51] Int. Cl. ........................................... F16g 7/12
[58] Field of Search ........................... 267/140, 139

[56] References Cited
FOREIGN PATENTS OR APPLICATIONS
1,219,902  1/1971  Great Britain .................... 267/141

Primary Examiner—James B. Marbert
Attorney, Agent, or Firm—William Anthony Drucker

[57] ABSTRACT

A mass of an elastic or plastic material or other deformable material is used to cushion and absorb the energy of impact when one rigid body strikes another, the mass of deformable material having at least one liquid filled leakproof interior cavity traversing substantially all of the mass. The mass is interposed between the impacting bodies and may be affixed to one or the other. The crushing effect of the impact pressurizes the liquid thereby causing the material to be stressed and deformed as energy is absorbed. A reservoir may be fixed between impacting bodies and be connected by tubing to a pressure vessel which expands to absorb energy.

12 Claims, 12 Drawing Figures

PRESSURIZED RUBBER FOR ABSORBING IMPACT ENERGY

CROSS REFERENCE TO RELATED APPLICATIONS

This application is a continuation-in-part of my copending patent application Ser. No. 111,534 filed Feb. 1, 1971.

BACKGROUND OF THE INVENTION

Field of the invention: This invention relates to an improved design for bumpers, fenders and other protective or cushioning devices made of deformable material.

S. Timoshenko in his book, Strength of Materials, Part I, "Elementary Theory and Problems" 3rd Edition, p. 303 presents the following data for the strain energy which can be stored by various materials without permanent set:

| Material | Energy Stored in Inch Pounds per Pound |
| --- | --- |
| Structural Steel | 53 |
| Tool Steel | 850 |
| Copper | 1.6 |
| Oak | 146 |
| Rubber | 8,900 |

When material is highly stressed so that permanent set occurs, far higher quantities of energy are absorbed. For example, a pound of heat treated medium carbon steel undergoing an elongation of only 5.4 percent will absorb 20,000 ft.-lbs. of energy. In absorbing energy of an impact, only that portion of the material which is struck undergoes deformation and absorbs energy. Portions of the deformable mass not in line with or near the direction of applied force are not deformed and from the energy absorption viewpoint are useless.

This invention provides an improved method for utilizing material for energy absorption so that when impact occurs, the entire mass is distorted and thereby absorbs energy.

DESCRIPTION OF THE PRIOR ART

Liquid filled bumpers are known in the prior art. For example, U.S. Pat. No. 3,284,122 describes an automobile bumer where in the event of collision the liquid is forced out of small openings at a controlled rate. The kinetic energy of impact of the automobile is dissipated as hydraulic friction, acceleration and velocity head of the liquid.

U.S. Pat. No. 3,494,607 describes a fluid cushion automobile bumper wherein energy is absorbed by a combination of (a) fluid flow in an elastomeric foam, (b) expansion of a diaphragm, and (c) compression of the foam.

These designs are bulky, heavy and expensive.

SUMMARY

The present invention is a method for more fully utilizing a mass of material such as an elastomer or a plastic material such as a chemical plastic or a metal stressed beyond the yield point to cushion and absorb the energy of impact when one rigid body strikes another. The method involves provision of at least one liquid filled leakproof interior cavity traversing substantially all of the material mass. The mass is held between the impacting bodies and may be attached to one of them. The crushing effect of the impact pressurizes the liquid thereby causing the material to be stressed, and deformed and energy to be absorbed. The energy absorbed in deforming the walls of this liquid filled pressure vessel is then not available to cause damage to the colliding bodies referred to.

In the present invention energy is absorbed in stretching of a pressure vessel of the chosen material exposed to internal pressure or compressing a vessel subjected to external liquid pressure. The vessel may be cylindrical, spherical or torridal in shape or may have other shapes. While the liquid is used to pressurize the vessel, hydraulic friction is not relied upon for energy absorption. In this important respect it differs from the prior art cited above.

The present invention results in more effective, more compact, less costly designs for impact energy absorption. If the material selected is not stressed beyond the yield point repeated impacts can be absorbed without damage to the vessel.

The concept has immediate application to the design of bumpers for automobiles, trucks and other vehicles.

In addition to automotive bumpers, there are many other applications for this improved apparatus and method of utilizing the energy absorbing properties of material. Among these applications are:

Crash barriers for installation along the side of high speed highways;

Fenders attached to the bow or side of a ship, tug boat or other vessel to minimize damage in the event of a collision;

Dock fenders attached to a dock or pier to minimize damage in berthing a ship;

A portable fender hung between two vessels at a pier or dock or between a vessel and the dock to absorb loads caused by movement of the vessel(s) due to wind, wave, or current;

Ship's armour protection, particularly underwater armour against torpedo attack;

Personal body armour and helmets for soldiers and law enforcement officers to absorb energy of a bullet or shrapnel; Fenders attached to truck loading docks.

In all these applications regardless of the location of the impact and the size of the impact area, it is desirable that the full mass of material will be deformed, thereby absorbing most effectively the energy of the impact.

FIRST EMBODIMENT

MATERIALS

The energy absorbing pressure vessel may be made of a material undergoing elastic deformation or from a material undergoing plastic deformation or from a material undergoing a combination of these.

Elastic deformation is the change in dimension occurring in a material subjected to a stress within the elastic limit; the original dimensions are restored upon release of the stress.

Plastic deformation is deformation that does or will remain permanent after removal of the stress which caused it.

For any material, the area under a stress-strain curve represents work done on unit volume of material undergoing deformation by the stress. The area under a stress-strain curve is thus a measure of the material's ability to absorb energy. For a bumper subjected to repeated impacts a preferred material is one having a stress-strain curve wherein the area under it from zero stress to the elastic limit is a maximum. When the material is called upon to absorb an impact load only once, the ideal material may be another one where the area under the stress-strain curve from zero stress to a point somewhere beyond the yield point is a maximum. Elastomers like rubber appear attractive for materials which are to be subjected to repeated impacts. Because of the large deformability of rubbers their stress-strain curves for a given stress value enclose greater areas than that of more rigid materials such as steel, cast iron, or aluminum.

There are a great many rubber formulations. Each has its own distinctive plot of stress vs. strain. A few such curves are depicted in FIG. 7.

Figure 7:
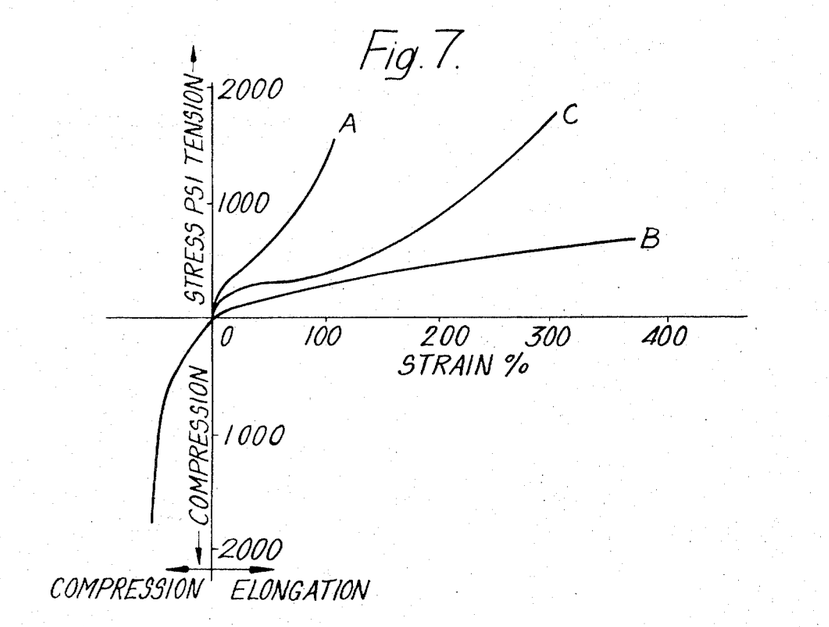
FIG. 7 is a graph showing stress-strain curves for a number of elastomers in tension and compression.

As shown in FIG. 7, very hard rubbers (A) deform little as compared with other elastomers even when stressed to the point of failure. While the slope is steep, the elongation is not high and the area under the curve is then relatively small. Soft rubber (B) deforms readily, however the stress at the elastic limit and at rupture is relatively modest. The energy absorption in that case is also disappointing. (Moreover, the large amount of stretching occurring before rupture is undesirable in another respect. The volume of the cavity grows so large under the influence of hydraulic pressure that the available supply of pressuring liquid may be insufficient.) Between the two extremes — very hard rubber on one hand, and very soft rubber on the other — lies the rubber (C) which will absorb the most energy per pound of weight.

Where the pressure vessel is only called upon to absorb energy but once and is thereafter replaced, metal can be utilized as the material of construction. At the point of ultimate failure, the strain will be on the order of 25–50 percent but for design purposes a lower stress value will ordinarily be chosen. For example, a strain of 15 percent might be appropriate. In any case the area under the stress-strain curves up to the selected strain value will be appreciable.

Figure 11:
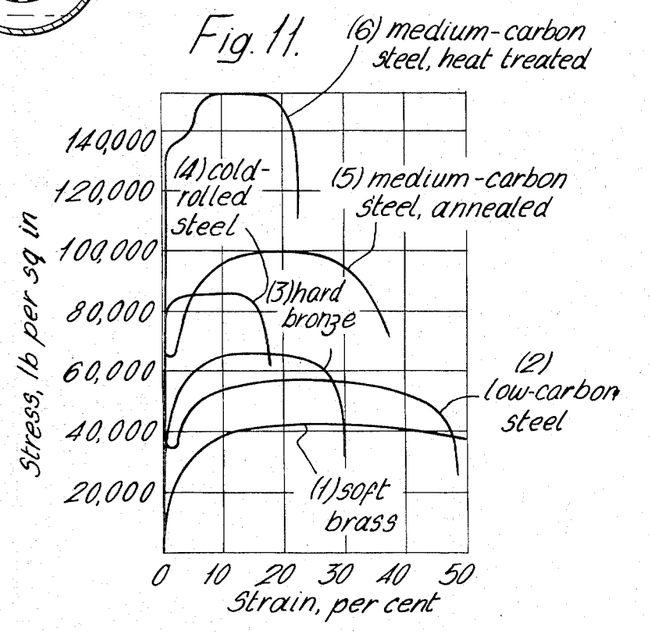
FIG. 11 is a stress-strain diagram for a number of metals.

FIG. 11 is an illustration taken from Mark's Mechanical Engineer Handbook Sixth Edition (McGraw-Hill) page 5-2 showing stress-strain curves for a number of metals.

VESSEL SUBJECTED TO INTERNAL PRESSURE

Figure 1:
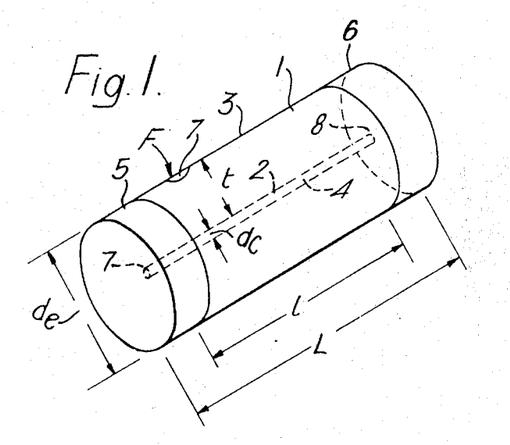
FIG. 1 is a simplified isometric view of a first embodiment of this invention showing its basic concept.

If any material is to be used efficiently to absorb impact energy associated with the collision of two rigid bodies it is desirable that all of the material mass be stressed and no substantial portion be left inactive. The desired result can be achieved by constructing the material as a cylindrical pressure vessel. The basic concept in its simplest form is depicted in FIG. 1. The pressure vessel 1 is positioned so that it will be between the impacting bodies when collision occurs. The impacting force F is assumed to have a radial direction. Although the pressure vessel 1 may be attached in an appropriate manner to one of the rigid bodies, attachment means have been omitted from FIG. 1 in the interest of clarity.

The cylindrical cavity or core 2 at the center of the cylinder 3 is filled with a nonfreezing liquid or jel 4 initially under atmospheric pressure.

The heads 5 and 6 of the vessel are preferably made integral with the cylindrical portions. The interior and exterior walls of the heads are preferably spherical in shape but may also be flat as shown in FIG. 1 or they may be elliptical or have other shapes.

Impact anywhere on the outside of the cylinder, for example, at area 7, will result in compression of the cylinder 3 and a squeezing out of the liquid 4 from that portion of the cavity 2 in line with the imposed force F. A pressure wave is created followed immediately by movement of the displaced liquids under pressure toward the heads of the vessel 5 and 6 away from area 7. The liquid under pressure presses outward against the wall of the cylindrical cavity 3 and against the ends 8 and 9 of the cavity. The cavity diameter $d_c$ is increased as is the outer diameter of the vessel $d_e$. The wall thickness $t$ becomes less; the length of vessel L is increased. This stretching of the material under the pressure loading represents work done on the material. The energy thus absorbed will not then be available to deform either of the rigid bodies involved in the collision.

It will be noted that essentially none of the energy of the impact is absorbed in acceleration of the liquid, or flow friction.

The term "energy absorption" is employed to suggest that energy is taken in by the material. All or a portion of the energy taken in may be returned when the stresses are released, i.e., at the conclusion of the impact.

Although in these pages one liquid filled cavity is shown, it may actually be advisable to provide several cavities in a vessel to insure that the entire mass of material will be utilized fully with respect to energy absorption.

Also, the vessel need not have a circular cross section but can be any other shape.

Specific examples will make the basic principles more clear.

Consider a collision of an automobile having a conventional steel bumper with a telephone pole. If impact occurs near the right end of the bumper that end may be greatly deformed and thus absorb energy. Perhaps the middle of the bumper may bend somewhat and thus absorb a little energy also. The left half of the bumper will be virtually intact and absorb no energy at all.

Figure 2:
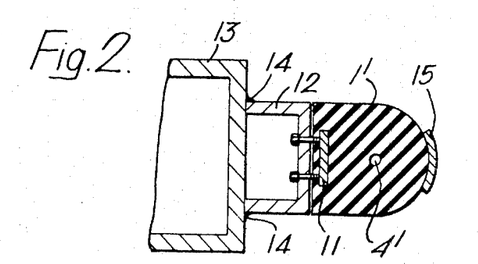
FIG. 2 is a transverse section through an automobile bumper based upon the first embodiment of this invention, showing conditions before collision occurs.
Figure 3:
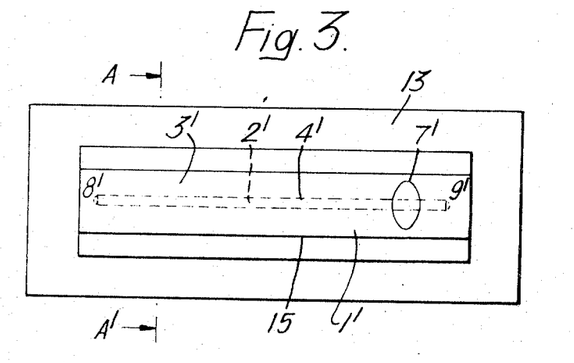
FIG. 3 is a front view of the bumper of FIG. 2.

The present invention provides a method whereby the entire bumper will participate in absorbing the energy of impact, not just the portion suffering the direct impact. This is achieved by fabricating the bumper as a leakproof pressure vessel 1' filled with liquid 4' as shown in FIGS. 2 and 3.

The initial diameter of the core $d_c$ of the vessel is very small relative to the outside diameter of the vessel $d_e$. The ratio of the two diameters is on the order of 1:10 the exact value being dependent upon the elastomer chosen and the severity of impact to be provided for.

The vessel is supported by an integral rigid structural bar 11, which is in turn affixed to a bracket 12 by bolts which in turn is affixed to the chassis of the vehicle 13 by welds 14.

Figure 4:
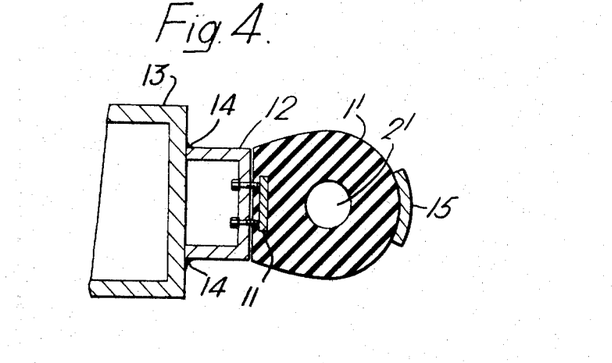
FIG. 4 is a transverse section through the bumper of FIG. 2 immediately after collision.

An impact at any point along the length of the bumper such as at area 7' will result in local crushing and collapse of the cavity and a pressurization of the liquid throughout the intact portions of the cavity area from 7' to end 8' and from area 7' to end 9' of the bumper and all of the material will participate in energy absorption. FIG. 4 illustrates enlargement of the cavity 2' immediately after impact. To minimize likelihood of tearing the vessel wall, a strip 15 of steel or other tough material may be affixed to the leading face of the pressure vessel 1'.

Figure 12:
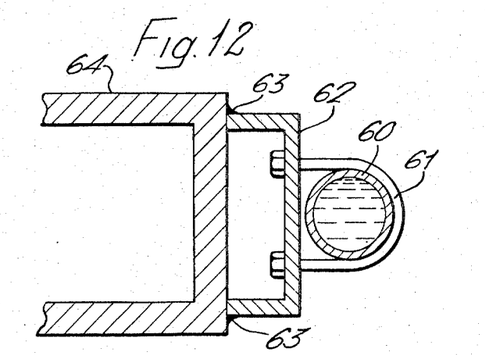
FIG. 12 is a transverse section through an energy absorbing automotibe bumper made of a metal tube according to the first embodiment of this invention.

A generally similar design can be made based upon use of a metal pressure vessel. As shown in FIG. 16, this could simply be a steel pipe 60 held by a U bolt 61 welded to a supporting beam 62 which in turn is welded at 63 to the chassis 64. In the case of a steel pressure vessel 60, the wall thickness will be less than for rubber. It should be thick enough that it will not be punctured by protuberances on either of the colliding bodies yet not so thick that it will fail to collapse under the force of any appropriate impact. By appropriate impact is meant any impact falling within the severity range which the bumper is desired to protect against.

Figure 5:
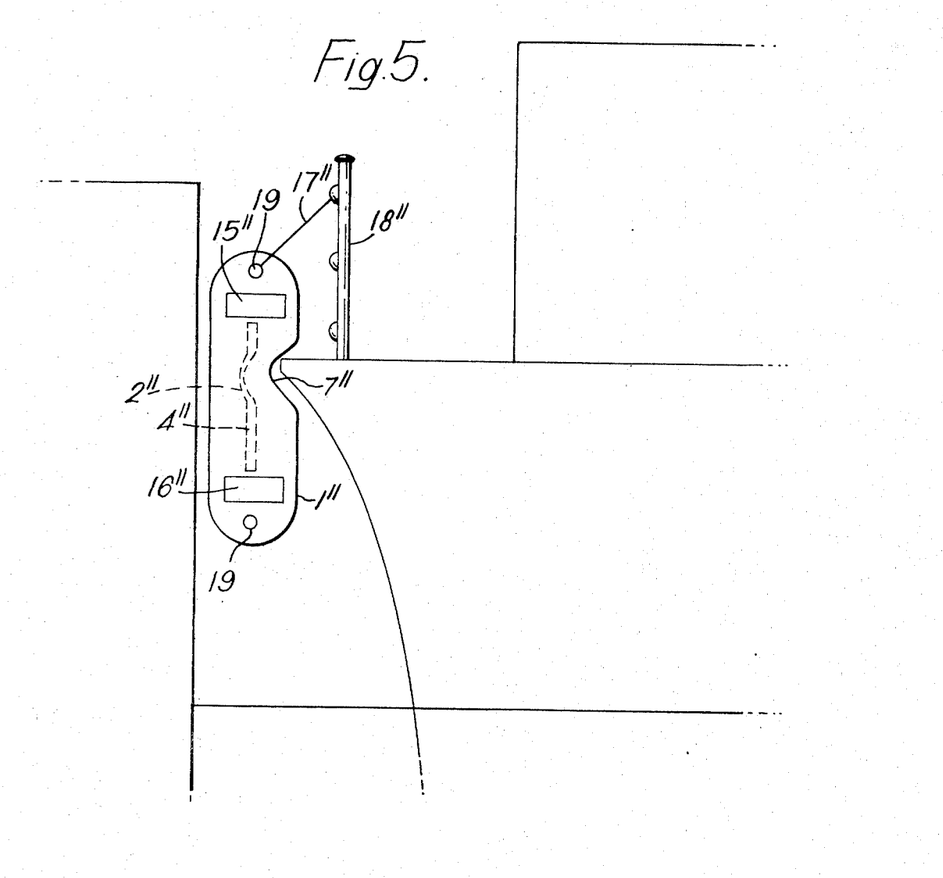
FIG. 5 is a side view of a portable boad fender based upon the first embodiment of this invention.

Other examples of this first embodiment of the invention will follow:

FIG. 5 depicts a portable fender for use in protecting a boat against damage due to repeated impact against a dock or pier or camel or another vessel moored alongside. The fender consists of an elongated pressure vessel 1'' having a liquid filled cavity 2''. Air filled cavities 15 and 16 are also provided to make the fender buoyant so that it can be more easily retrieved in the event it is accidentally dropped into the water. The fender is interposed between boat and dock and used in vertical orientation. It is hung over the side, bow or stern, of the boat or from the pier by the line or rope 17''One end of the line is secured to the boat's structure such as a liferail stanchion 18''. The other is tied to the fender at the eye 19. For this boat fender application an elastomer like rubber may be the most suitable material but other material may also be used.

When any portion of the pressure vessel such as 7'' is compressed as a consequence of movement of the boat toward the dock, the liquid 4'' in the cavity 2'' is pressurized and the entire mass of material absorbs the energy of the impact.

Figure 6:
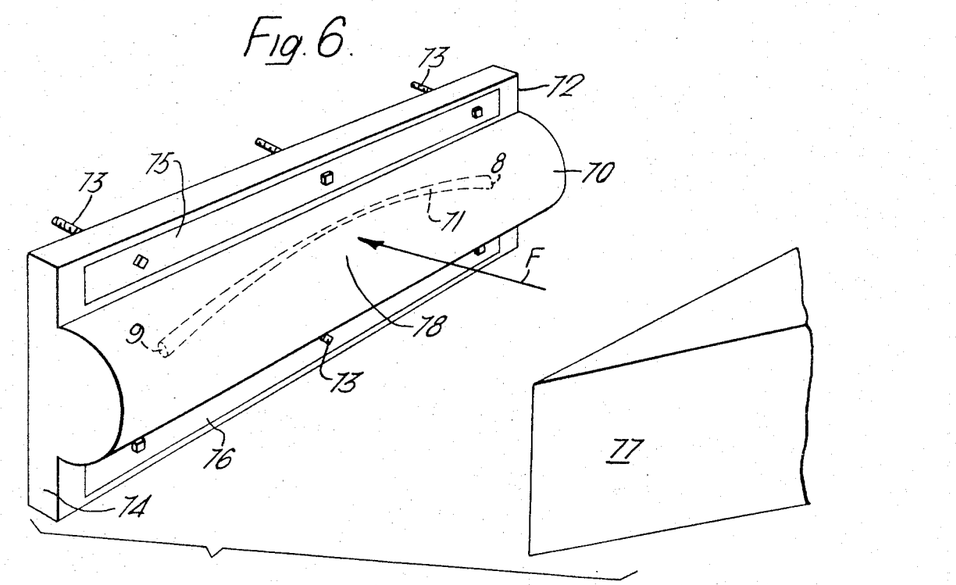
FIG. 6 is an isometric view of a fender for a truck unloading dock based upon the first embodiment of this invention.

The first embodiment of the invention may be adapted as a fender on truck loading docks to cushion repeated "back-up" shock protecting the dock structure and the truck body. A view of one design is shown in FIG. 6. The pressure vessel 70, perhaps 6 feet long and made of rubber with its interior liquid filled cavity 71, is mounted horizontally on a dock wall 72. It is secured by long bolts 73 passing through holes in the rubber flange 74 and in retaining flat bars 75 and 76. The rear corner of truck body 77, striking the pressure vessel fender 70 at any point 78 along its length will cause the entire length of the vessel to be pressurized. Again, all of the vessel mass is stretched and made to absorb energy of the impact.

SECOND EMBODIMENT

VESSELS WITH BUILT UP WALL

In a thick-walled pressure vessel, there is a considerable variation in stress from the inner surface to the outer. In the case of a vessel subjected to internal pressure, the stress at the inner surface exceeds that of the outer surface by the value of the internal pressure p. This means that the material near the outside of the rubber cylinder is not absorbing its full share of strain energy.

Figure 8:
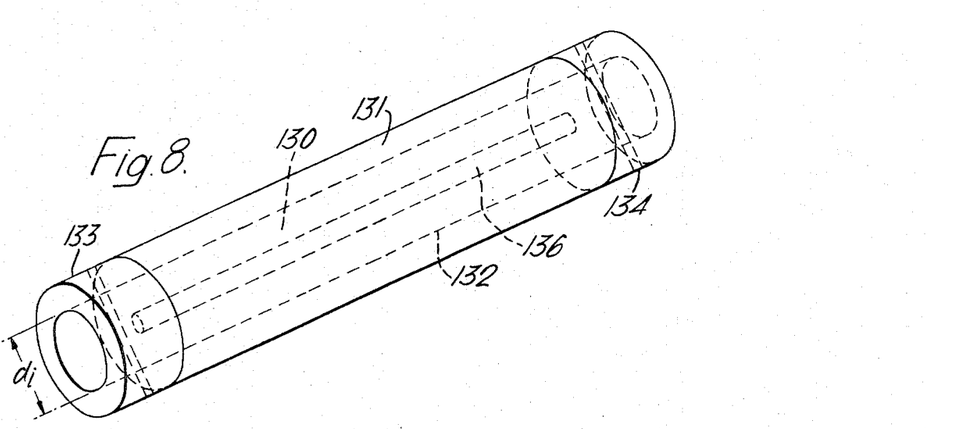
FIG. 8 is an isometric view of the third embodiment of the invention showing a cylindrical vessel with a two-layer wall.

Now refer to FIG. 8. A more favorable initial stress pattern can be created by shrinking on the cylinder 130 an outer cylindrical liner 131 so that a contact pressure is produced at the surface 132 between the two. This puts the inner cylinder 130 in compression while in the undisturbed pre-collision condition. The outer cylinder 131 is always in tension. The inside diameter $d_i$ of the outer cylinder 131 when unstressed is smaller than the outer diameter of the unstressed inner cylinder 130. The outer cylinder 131 is stretched and slipped over the outside of the inner cylinder 130. Inner and outer cylinders can be made of same or different materials. FIG. 8 shows reinforcing rings 133 and 134, inner cylinder 130 and outer cylinder 131 after assembly.

When collision occurs the built-up cylinder is subjected to an internal pressure. The high resulting stresses near the inner surface 132 are partially offset and diminished by the shrink fit stresses. On the other hand, the stresses at the outer surface of the outer cylinder 131 is higher than for a solid wall cylinder, thus a more nearly uniform stress pattern is obtained. This means the vessel's absorption and energy storage properties are more uniformly and more fully utilized.

The method for calculating stresses in a vessel having a multiple layer wall is described in pages 46–58 of the book, Pressure Vessel Design — Nuclear and Chemical Applications by John F. Harvey, 1963, published by D. Van Nostrand. There the outer vessel, presumably made of steel, is expanded by means of heat so that it can be slipped over the inner vessel. Cooling then establishes the desired contact pressure.

The vessel can be made of any material. If an elastomer like rubber is employed large amounts of energy can be stored at relatively modest stress values. Moreover, the vessel can be subjected to repeated shocks without need for a replacement.

Figure 9:
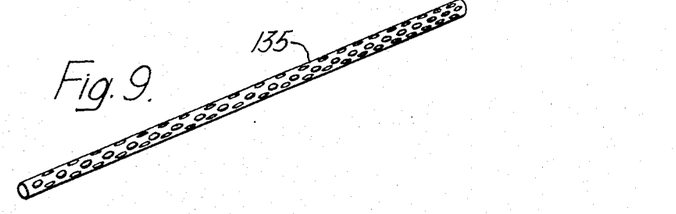
FIG. 9 is an isometric view of a perforated tubular support which fits inside the cavity of the rubber inner vessel shown in FIG. 8.

An unusually high dimensional interference must be provided in a built-up rubber vessel to allow for rubber's stress relaxation and creep properties as well as its high elongation. To insure against collapse of the inner cavity 136 in the rubber vessel because of excessive initial shrinkage stress created by the outer liner 131, a perforated rigid metal cylinder 135 can be inserted in the cavity 136, as shown in FIG. 9. The diameter of this perforated metal cylinder 135 should be very slightly smaller than that of the cavity 136 after the outer liner 131 is shrunk over the inner rubber cylinder 130. The length of the perforated metal cylinder should be the same as the length of the cavity 136.

The built-up vessel may be used with or without a pressurization reservoir.

THIRD EMBODIMENT
VESSEL SUBJECTED TO EXTERNAL PRESSURE

Figure 10:
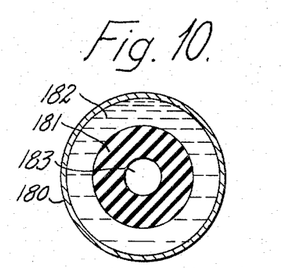
FIG. 10 is a transverse section through the fourth embodiment of the invention showing a cylindrical outer vessel, a cavity filled with liquid and an inner evacuated vessel immersed in the liquid.

The foregoing embodiments of this invention involve a pressure vessel subjected to internal pressure. It is possible also for an energy absorbing bumper to be designed as a pressure vessel 181 subjected to external pressure as shown in FIG. 10. The bumper consists of an outer cylindrical pressure vessel of steel 180 or other tough, strong material having high modulus of elasticity. This outer vessel is filled with liquid 182 at atmospheric pressure. Also, inside the steel outer shell 180 is a smaller thick-walled pressure vessel 181 made of energy absorbing material such as rubber or other elastomers. This vessel 181 may be mounted concentrically or located off-center. The hollow cavity 183 of the rubber vessel 181 is filled with air or an inert gas like nitrogen, or with a vacuum, the latter being preferable. Vacuum can be created during the manufacturing process by filling the hollow core with steam or other condensible gas before closing. Upon cooling and condensation of the steam, a vacuum will result.

In the event of a collision, the outer steel pressure vessel 180 will be crushed raising the pressure of the contained liquid 182. This increase in pressure will result only in a slight stretching of the uncrushed portion of the outer vessel 180 because of its high modulus of elasticity. The rubber vessel will, however, undergo a large deformation. Its outside diameter will be decreased. The diameter of the cavity 183 will likewise be reduced and much of the volume formerly occupied by vacuum or air will now be occupied by rubber.

The required initial diameter of the rubber vessel's hollow core 183 is dependent upon the amount of energy to be absorbed and the stress-strain characteristics of rubber and steel. It must be large enough to accommodate the rubber forced into the core space as a result of the pressure exerted on the outside of the rubber vessel 181 by the pressurized liquid 182.

The externally pressurized rubber vessel has two advantages over the internally pressurized concept.

The energy absorption (ft.-lbs/lb.) of rubber in compression may be greater than that of rubber in tension. Secondly, the interconnecting hoses or piping 28, 29 of FIG. 8 between the liquid reservoir 27 and the rubber pressure vessel 81 are eliminated and thus the danger of loss of liquid due to tear or leak is minimized.

On the other hand, an externally pressurized vessel assembly including an outer steel vessel 180 will probably have to be more bulky to accommodate the empty cavity 183 of the rubber vessel 181 and the surrounding liquid 182.

In a vessel under internal pressure the stress in the wall is greatest at the interior and diminishes toward the exterior — the region most likely to be subjected to tears and puncture. From this viewpoint them, the internally pressurized design is favored.

Liquid: In all embodiments of this invention the liquid filling the pressure vessel (and the crushable reservoir, if any) should have these properties:

1. Its freezing point must be below the lowest temperature which will be encountered.
2. Its specific gravity should preferably be low.
3. It must not chemically react with the material used to fabricate the pressure vessel and crushable reservoir or interconnecting piping, if any.

One suitable liquid is ethylene glycol.

Another is petroleum oil. This is a particularly appropriate selection for use in fenders installed on the sides of tankers.

A jel may also be used.

If for any reason it is necessary to fabricate the vessel of material which is incompatible with the selected liquid it will be necessary to protect the cavity and any other wetted parts with a protective liner or coating.

The term liquid as used herein includes many substances which act as an incompressible liquid. Such substances would include rubber or urethane elastomers in, for example, a steel reservoir and pressure vessel. These substances would "flow" and react to load by exerting pressure in all directions. Tiny spheres of uniform size of rigid solid material may be used as these would also "flow" to exert pressure.

While some preferred embodiments and applications of the basic invention have been given for the purpose of disclosure, numerous other embodiments and application and changes in detail of design, shape, size, arrangement, construction, and combination may be resorted to without departing from the spirit and scope of the invention. The term deformable material as used herein is to be interpreted in its broadest sense to include any solid material which undergoes dimensional changes when stressed in tension, compression or shear. The term rubber is used herein in the broadest possible sense to designate any elastomer whatsoever. The term plastic is similarly to be interpreted in its broadest possible sense to include all chemical plastics such as polyvinyl chloride and polypropylene. Steel is included in this invention behaving as an elastic material when stressed up to the yield point and behaving as a plastic when stressed beyond the yield point. The invention is applicable to other metals also, such as aluminum, bronze, brass, copper, vanadium, magnesium and other metals.

Example: Consider for example a C3 type vessel having a full load displacement of 16,000 tons, a length of 478 feet and a draft of 26 feet. While traveling at a velocity $V$ of 10 knots it strikes a tanker moving at right angles to it. The collision is inelastic and the two vessels remain locked together after the collision. The mass of the C3, $M_s$ is $$(16,000 \times 2,200)/32.2 = 1,093,000 \text{ slugs}$$

A mass of sea water $M_w$ moves with the C3. Its magnitude may be approximated by $$M_w = (II/4) \times d D^2 L$$

where:
$M_w$ = mass of seawater moving with vessel
$D$ = draft of vessel
$L$ = length
$d$ = density of seawater in slugs/ft³ = 64/32.2

$$M_w = 3.14/4 \times 64/32.2 \times (26)^2 \times 470$$

$$M_w = 489,300 \text{ slugs}$$

the total mass of ship plus moving seawater is 1,582,000 slugs. $E$, the kinetic energy of the C3 ship and the associated seawater is given by:

$$E = 1/2 \, MV^2$$
$$= 1/2 \times 1,582,000 \times 16.0^2$$
$$= 226,000,000 \text{ ft.lbs.}$$
$$= 2,712,000,000 \text{ inch lbs.}$$

Let us assume now that the ship which is struck is a tanker 700 feet long, girded with a single row of steel fender sections each made of pipe 50 feet long filled with ethylene glycol. Let us further assume that 1/2 of the kinetic energy possessed by the C3 and its associated water is absorbed by the tanker's structure. The remainder persists as kinetic energy of the two vessels moving through the water together after the collision or is absorbed in deformation of the bow of the C3.

Let us assume that the collision impact causes a 15 foot length of one 50 foot section of the C3's pipe fender to collapse without creation of cracks. This means the liquid will be squeezed out into the remaining 35 feet of this particular fender section. To accommodate this additional liquid, the volume of the uncrushed portion will be increased by 15/35 or 43 percent. The diameter and circumference will be increased by 19.6 percent, assuming negligible elongation of the pipe. In this stretching of the pipe wall energy is absorbed so that there is little or no energy left to deform the ship structure itself.

By inspection of curve 6 of the accompanying stress-strain diagram for metals it will be seen that a heat treated medium carbon steel undergoing a strain of 19.6 percent will be subjected to a stress of about 145,000 psi. The area under the stress-strain curve, which represents the work done on the metal, is about 28,400 in-lbs/in³.

The volume of steel needed to absorb the C3's half of the kinetic energy is, therefore, $$1/2 \times 2,712,000,000/28,400 = 48,000 \text{ in}^3.$$

This is equivalent to 690 in³ for each of the 35 uncrushed ft. or 57 in³ per inch of pipe. A pipe with a transverse metal area of 57 in² is needed. The metal in such a pipe will weigh about 195 pounds per foot of pipe length.

A 12 inch pipe with a wall thickness of 1¾ inches will meet this requirement. The ethylene glycol solution assuming a S.G. of 1.0 will weigh 39.3 lbs/per foot. The 50 foot length with its contained liquid will weight 11,000 pounds. For a tanker 700 feet long with a displacement of 50,000 tons the total weight of all the fenders would be on the order of 150 tons, exclusive of supporting members and a protective facing for the pipe. This latter may be made of a tough tear resistant material, such as Hadfield austenitic manganese steel. The total increase in the ship's displacement attributable to the fenders is estimated at 230 tons. This is less than 1/2 of 1 percent of the vessel's total displacement.

1. Installation on the sides, bow or stern of a tanker (or dry cargo ship, boat, barge or other vessel) of an energy absorbing fender consisting of a pressure tight cylinder filled with a liquid or equivalent substance. The impact of a collision will crush a portion of the cylinder causing the liquid to be pressurized and thereby stretch the wall of the uncrushed portion of the cylinder. The energy absorbed by this stretching of the wall will then not be available to cause extensive damage to other portions of the ship.

2. The cylinders can be mounted outboard of the ship's hull plating or inboard.

3. The fender cylinders can be made an intrinsic part of the ship's structural framework or can be independent.

4. A portion of the oil cargo can be utilized as the pressurizing liquid, thereby reducing the weight pentalty associated with installation of the fender.

5. The fender cylinders can be made an intrinsic part of the cargo tanks.

6. Making the cylinder of a steel whose stress-strain diagram, at least up to the point of maximum stress, encloses the largest possible area.

7. Selecting the total cylinder length to be longer than the maximum expected crushed length by a sufficient amount so that the liquid displaced from the crushed portion after impact will stress the cylinder wall to a value beyond the yield point.

8. Selecting the cylinder wall thickness to satisfy three requirements:
   a. to provide within the length and diameter chosen the required mass of metal needed to absorb the kinetic energy of the collision;
   b. to be sufficiently thin so that the force of the collision will crush it;
   c. to be sufficiently thick so that it will not be punctured.

9. Selecting the diameter so that the thickness and mass criteria given above can be satisfied.

10. Providing a facing of tough, tear resistant material on the outboard outer portion of the cylinder.

What is claimed is:

1. A device to absorb energy when one body strikes another comprising, in combination: a reservoir containing a cavity, said reservoir being placed between said bodies; a pressure vessel; means freely connecting said cavity hydraulically to said pressure vessel an allowing unrestricted flow; and fluid within said cavity and pressure vessel, so that the crushing of said reservoir by said bodies causes said fluid to transmit a pressure surge through said means beyond the yield point to said pressure vessel deforming said pressure vessel to absorb energy.

2. The combination according to claim 1 wherein said reservoir, said pressure vessel, and said means connecting said cavity to said pressure vessel comprise a elongated closed hollow member, said cavity extending along the length of said member so that crushing a portion of said member causes said fluid to deform other portions of said member for absorbing energy.

3. The combination according to claim 2 wherein said elongated member is of an elastomer containing at least one fluid filled cavity.

4. The combination according to claim 2 with the addition of a protective element of wear resistant material fixed to said member over areas of potential impact.

5. The combination according to claim 2 wherein said member is of metal containing a fluid filled cavity.

6. The combination according to claim 5 wherein said member is of steel.

7. The combination according to claim 1 wherein said pressure vessel has an inner cylinder containing said cavity and an outer cylinder disposed about said inner cylinder, and said outer cylinder compressing said inner cylinder.

8. The combination according to claim 7 with the addition of a support means within said cavity preventing the collapse of said cavity.

9. The combination according to claim 1 wherein said reservoir is of thin walled, tough tear resistant material and said pressure vessel is partially of an elastomer.

10. The combination according to claim 9 wherein said reservoir is made of metal.

11. The combination according to claim 9 wherein there is a plurality of said reservoirs and means connecting said reservoirs to a single pressure vessel.

12. The combination according to claim 9 wherein said reservoir and said pressure vessel are of substantially the same length, said reservoir being mounted on said pressure vessel to receive impact.

* * * * *